United States Patent
Mashiko et al.

(10) Patent No.: US 11,763,570 B2
(45) Date of Patent: Sep. 19, 2023

(54) OBSTACLE DETECTION DEVICE, OBSTACLE DETECTION METHOD, AND STORAGE MEDIUM STORING OBSTACLE DETECTION PROGRAM

(71) Applicant: ALPS ALPINE CO., LTD., Tokyo (JP)

(72) Inventors: Kaoru Mashiko, Tokyo (JP); Tomoki Nakagawa, Tokyo (JP); Tatsuya Matsui, Tokyo (JP)

(73) Assignee: Alps Alpine Co., LTD., Tokyo (JP)

( * ) Notice: Subject to any disclaimer, the term of this patent is extended or adjusted under 35 U.S.C. 154(b) by 245 days.

(21) Appl. No.: 17/355,606

(22) Filed: Jun. 23, 2021

(65) Prior Publication Data

US 2022/0004783 A1   Jan. 6, 2022

(30) Foreign Application Priority Data

Jul. 2, 2020  (JP) ................................ 2020-114935
Aug. 25, 2020 (JP) ................................ 2020-141703

(51) Int. Cl.
*G06V 20/58*   (2022.01)
*G06T 7/70*    (2017.01)
*G06V 20/64*   (2022.01)
*G06V 10/22*   (2022.01)

(52) U.S. Cl.
CPC ............... *G06V 20/58* (2022.01); *G06T 7/70* (2017.01); *G06V 10/22* (2022.01); *G06V 20/64* (2022.01); *G06T 2207/10012* (2013.01); *G06T 2207/10028* (2013.01); *G06T 2207/30261* (2013.01); *G06V 2201/07* (2022.01)

(58) Field of Classification Search
CPC .... G06K 9/00805; G06V 20/58; G06V 20/64; G06V 10/22
See application file for complete search history.

(56) References Cited

U.S. PATENT DOCUMENTS

2014/0307952 A1* 10/2014 Sweeney .............. G06V 10/811
                                                    382/154

FOREIGN PATENT DOCUMENTS

| GB | 2563198 A | 12/2018 | |
| JP | 2013-20543 | 1/2013 | |
| WO | WO2018166747 | * 9/2018 | ............... G06K 9/00 |

OTHER PUBLICATIONS

Extended European Search Report dated Dec. 1, 2021 in EP Application No. 21181403.3, 10 pages.

* cited by examiner

*Primary Examiner* — Myron Wyche
(74) *Attorney, Agent, or Firm* — Crowell & Moring, L.L.P.

(57) ABSTRACT

An obstacle detection device includes a stereo camera that captures IR images on the right side and left side; a point cloud data creation unit that creates point cloud data having three-dimensional position information from the IR images captured by the stereo camera; an obstacle detection unit that detects an obstacle according to point cloud data; an invalid area identification unit that identifies whether an invalid area with no point cloud is present in point cloud data; and a target recognition unit that recognizes a particular target in the invalid area with no point cloud according to an IR image. When a particular target is recognized by the target recognition unit, the obstacle detection unit does not determine the invalid area with no point cloud to be an obstacle.

18 Claims, 12 Drawing Sheets

AVERAGE BRIGHTNESS: 54
CONFIDENCE FACTOR: 99%

NON-UNIFORMITY IN DISTANCE MEASUREMENT

WITHOUT DEPTH MISSING AREA

OBSTACLE DETECTION DEVICE, OBSTACLE DETECTION METHOD, AND STORAGE MEDIUM STORING OBSTACLE DETECTION PROGRAM

RELATED APPLICATIONS

The present application claims priority to Japanese Patent Application Number 2020-114935, filed Jul. 2, 2020, and Japanese Patent Application Number 2020-141703, filed Aug. 25, 2020, the entirety of which are hereby incorporated by reference.

BACKGROUND

1. Field of the Invention

The present invention relates to an obstacle detection device, and more particularly to detection of an obstruction by use of a stereo camera.

2. Description of the Related Art

An infrared sensor or a milli-wave radar are known as a sensor that detects a distance to an object such as an obstacle. A stereo camera is one type of distance sensor and detects a distance to an object by using parallax between images captured by two cameras. For example, Japanese Unexamined Patent Application Publication No. 2013-20543 discloses an obstacle detection device for use with a vehicle, the device having an infrared camera that captures a scene in front of a vehicle and a stereo camera that captures a scene in front of the vehicle. With the technology in the obstacle detection device, a path is identified from an infrared image captured by the infrared camera and an obstacle on the identified path is detected from a stereo image captured by the stereo camera.

A certain conventional obstacle detection system uses an infrared (IR) camera as a stereo camera. On an infrared (IR) image captured by an IR camera, an area that reflects infrared light appears in white and an area that absorbs infrared light appears black. Brightness is high in the white area and is low in the black area.

The obstacle detection system combines IR images, captured by the stereo camera, on the right side and left side, and creates point cloud data that can represent the three-dimensional point of the captured target. The depth (distance) to the captured target is calculated by using parallax between the right and left IR images. The obstacle detection system determines whether any obstacle, which include obstacles on the ground as well as holes and grooves in the ground, is present. If an obstacle is present, the obstacle detection system detects the orientation of the obstacle, the distance to the obstacle, and the size of the obstacle, and outputs the detection result. If, for example, the obstacle detection system is mounted on a transport device such as an automobile, the system is used to alert the passenger of information about the obstacle or to cause the transport device to automatically decelerate or stop.

If a dynamic range for the brightness of the IR camera is not sufficient for the distribution of the brightness of the captured target, however, the conventional obstacle detection system has a problem as described below. If an IR image includes an area in which brightness is maximum or minimum or an area in which brightness is substantially maximum or minimum, data about the area is not enough to represent features of the captured target. As a result, even when the right and left images are combined, an invalid area appears for which depth information is not included in point cloud data.

When, for example, a manhole is present on a road, if sunlight is strongly reflected on the manhole, the manhole appears in a circular shape in pure white in the central area of an IR image, as indicated in FIG. 1. This prevents depth calculation, in which matching is performed for characteristic portions on the right and left images, but cannot be performed for the manhole portion. Therefore, as indicated in FIG. 2, the point cloud data has an invalid area (pure black portion in the drawing), in which a point cloud is missing, in the area corresponding to the area of the manhole. The point cloud data in the drawing indicates a state in which a manhole is viewed from above at an oblique angle.

Since an invalid area with no point cloud lacks distance information, it cannot be determined whether an invalid area with no point cloud is an obstacle. From the viewpoint of implementation, however, when an invalid area with no point cloud is generated, it is determined for a margin of safety that an obstacle is present. If an obstacle is not actually present in the invalid area with no point cloud, therefore, an obstacle is detected by mistake. When the obstacle detection system is mounted in, for example, a transport device, an unnecessary alert is issued for the passenger. Alternatively, the transport device is unnecessarily decelerated or stopped.

SUMMARY

The present disclosure addresses the conventional problem described above with the object of providing an obstacle detection device having a false detection prevention function, an obstacle detection method, and a storage medium that stores an obstacle detection program.

An obstacle detection device according to the present disclosure comprises: a stereo camera; a creation means for creating point cloud data according to a stereo image captured by the stereo camera; an obstacle detection means for detecting an obstacle according to the created point cloud data; and a recognition means for recognizing a particular target through image recognition. The obstacle detection means detects an obstacle by using point cloud data excluding an area recognized by the recognition means as being a particular target.

In one aspect, the recognition means recognizes a particular target in an area equivalent to an invalid area with no point cloud, the invalid area being included in the point cloud data. In another aspect, the recognition means includes an identification means for identifying an invalid area with no point cloud, the invalid area being included in the point cloud data. In another aspect, when a particular target is recognized by the recognition means, the obstacle detection means does not determine the invalid area to be an obstacle. In another aspect, the particular target is a target that does not become an obstacle, and is determined in advance. In another aspect, the point cloud data is three-dimensional information including distance information obtained by combining an image captured by the stereo camera. The invalid area with no point cloud is an area that lacks distance information. In another aspect, the recognition means recognizes a particular target according to an image captured before point cloud data is created. In another aspect, the recognition means recognizes a particular target according to an image captured by another camera different from the stereo camera, the image being synchronized with the stereo image captured by the stereo camera. In another aspect, the stereo camera is an infrared camera. In another aspect, the stereo camera captures a scene in front of a moving body.

An obstacle detection device according to the present disclosure comprises: a stereo camera; a creation means for creating point cloud data according to a stereo image captured by the stereo camera; an obstacle detection means for detecting an obstacle according to the created point cloud data; and a recognition means for recognizing a particular target through image recognition. The obstacle detection means decides whether to detect an obstacle by using a result of recognition by the recognition means according to brightness information about an image used by the recognition means. In one aspect, when the brightness information is lower than or equal to a first threshold value, the obstacle detection means detects an obstacle by using only the point cloud data; and when the brightness information exceeds the first threshold value, the obstacle detection means detects an obstacle by using both the point cloud data and the result of recognition by the recognition means. In one aspect, the obstacle detection means decides whether to detect an obstacle by using the result of recognition by the recognition means according to not only the brightness information but also a confidence factor in image recognition by the recognition means. In one aspect, when the brightness information is lower than or equal to the first threshold value and the confidence factor is lower than or equal to a second threshold value, the obstacle detection means detects an obstacle by using only the point cloud data; and when at least one of the first threshold value for the brightness information and the second threshold value for the confidence factor is exceeded, the obstacle detection means detects an obstacle by using both the point cloud data and the result of recognition by the recognition means. In one aspect, the first threshold value for the brightness information is set for each particular target.

A moving body according to the present disclosure includes the obstacle detection device described above and a control means for controlling the travel of the moving body by using a result of detection by the obstacle detection device.

An obstacle detection method according to the present disclosure detects an obstacle by using a stereo image captured by a stereo camera. The method comprises: creating point cloud data including distance information about a captured image, according to the stereo image captured by the stereo camera; identifying whether an invalid area with no point cloud is present in the point cloud data; recognizing whether a particular target is present in an invalid area with no point cloud; and detecting, when a particular target is recognized, an obstacle by using point cloud data excluding the invalid area with no point cloud.

An obstacle detection method according to the present disclosure detects an obstacle by using a stereo image captured by a stereo camera. The method comprises: creating point cloud data including distance information about a captured target, according to the stereo image captured by the stereo camera; identifying whether an invalid area with no point cloud is present in the point cloud data; recognizing whether a particular target is present in an invalid area with no point cloud; and deciding whether to detect an obstacle by using a result of recognition in the recognizing according to brightness information about an image used in the recognizing.

An obstacle detection program according to the present disclosure is executed by an electronic device. The program comprises: creating point cloud data including distance information about a captured image, according to a stereo image captured by the stereo camera; identifying whether an invalid area with no point cloud is present in the point cloud data; recognizing whether a particular target is present in an invalid area with no point cloud; and detecting, when a particular target is recognized, an obstacle by using point cloud data excluding the invalid area with no point cloud.

An obstacle detection program according to the present disclosure is executed by an electronic device. The program comprises: creating point cloud data including distance information about a captured target, according to a stereo image captured by a stereo camera; identifying whether an invalid area with no point cloud is present in the point cloud data; recognizing whether a particular target is present in an invalid area with no point cloud; and deciding whether to detect an obstacle by using a result of recognition in the recognizing according to brightness information about an image used in the recognizing.

According to the present disclosure, an obstacle is detected by using point cloud data excluding an area in which a particular target has been recognized by a recognition means. Therefore, it is possible to prevent a false detection attributable to an invalid area with no point cloud.

According to the present disclosure, it is decided whether to detect an obstacle by using a recognition result according to brightness information about an image used by a recognition means. In detection of an obstacle, therefore, it is possible to prevent a false detection in image recognition and to detect an obstacle.

DETAILED DESCRIPTION OF THE PREFERRED EMBODIMENTS

An obstacle detection device according to the present disclosure detects an obstacle by using a stereo image captured by a stereo camera. In one aspect, the obstacle detection device is mounted in a moving body or transport device such as an automobile. The result of detection by the obstacle detection device is used in, for example, control of the travel of the moving body.

EXAMPLES

Figure 3:
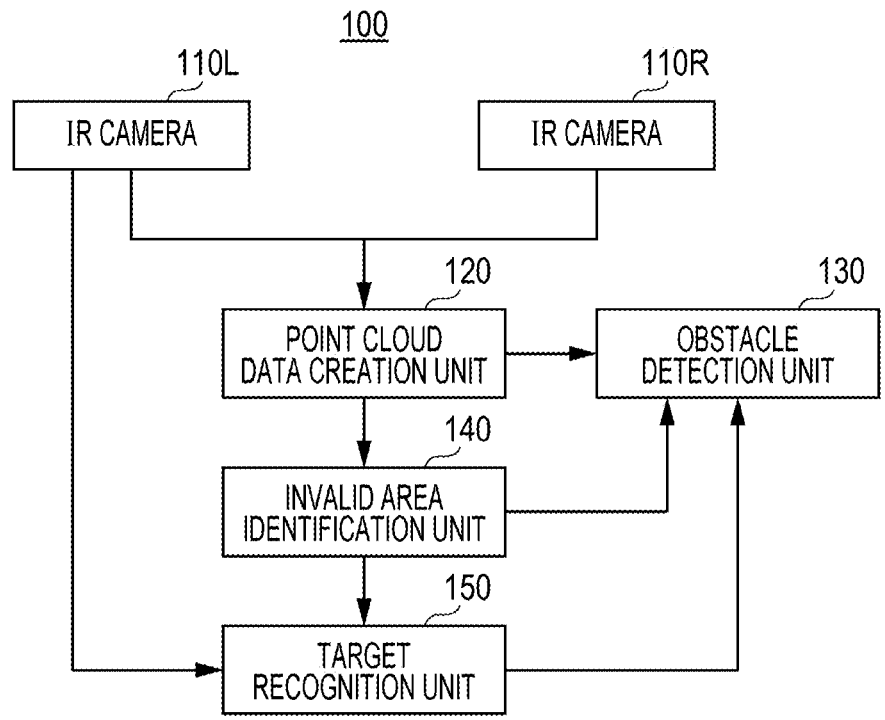
FIG. 3 is a block diagram illustrating the structure of an obstacle detection device according to a first example of the present invention.

Next, a first example of the present invention will be described in detail with reference to the drawings. FIG. 3 is a block diagram illustrating the structure of an obstacle detection device according to the first example of the present invention. The obstacle detection device 100 in this example includes: IR cameras 110R and 110L that capture IR images on the right side and left side (a stereo camera 110 will be used to collectively refer to the stereo cameras 110R and 110L); a point cloud data creation unit 120 that combines stereo images captured by the stereo camera 110 and creates point cloud data in which a depth has been calculated; an obstacle detection unit 130 that detects an obstacle according to point cloud data; an invalid area identification unit 140 that identifies whether an invalid area with no point cloud is present in point cloud data; and a target recognition unit 150 that recognizes a particular target in the invalid area with no point cloud according to an IR image.

The structures of the point cloud data creation unit 120, invalid area identification unit 140, target recognition unit 150, and obstacle detection unit 130 are implemented by hardware and/or software in a computer or an electronic device. Specifically, the hardware includes a graphic processor unit (GPU), a central processing unit (CPU), and a storage medium such as a memory, and the software includes programs and applications stored in a storage medium or the like or programs and applications downloaded from a server or the like through a network.

Figure 4:
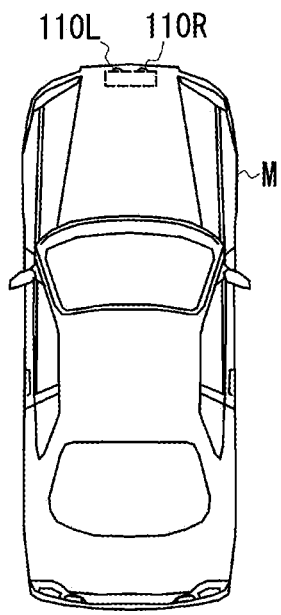
FIG. 4 illustrates an example of the attachment of a stereo camera to a vehicle.

There is no particular limitation on the position at which to attach the stereo camera 110. For example, however, the stereo camera 110 is attached to the front of a vehicle M as illustrated in FIG. 4, and captures a scene in front of the vehicle M. The IR cameras 110R and 110L, which use infrared rays, can take a picture of an object even during the night. The IR cameras 110R and 110L may emit an infrared pattern. However, infrared rays forming the pattern are invisible to a human. This is advantageous in that discomfort is not felt. The IR cameras 110R and 110L each create a plurality of frames in one second. Pixels forming one frame represent a captured target with, for example, 256-level grayscale brightness. An IR image captured by an IR camera is a gray scale image in black and white on which an area that reflects infrared rays appears in white and an area that absorbs infrared rays appears in black. The two IR cameras 110R and 110L have the same number of pixels and the same optical characteristics. The coordinate positions of the IR cameras 110R and 110L are known. For example, the two IR cameras 110R and 110L are placed at the same height (placed horizontally) and are spaced by a predetermined distance.

Figure 1:
FIG. 1 indicates an example in which a portion with high brightness appears in an IR image.
Figure 2:
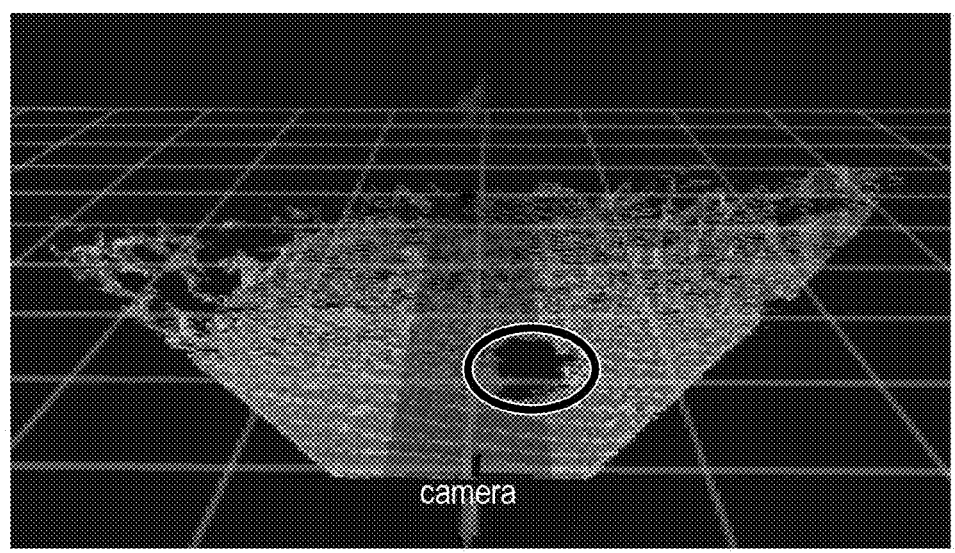
FIG. 2 indicates point cloud data obtained by combining the IR stereo image indicated in FIG. 1.

The point cloud data creation unit 120 receives IR images captured by the IR cameras 110R and 110L. The point cloud data creation unit 120 performs matching between the right and left IR images and calculates a depth (distance) to the captured target from a parallax. Finally, the point cloud data creation unit 120 creates point cloud data representing the three-dimensional position of the captured target obtained by combining the right and left IR images, as indicated in FIG. 2.

Figure 5:
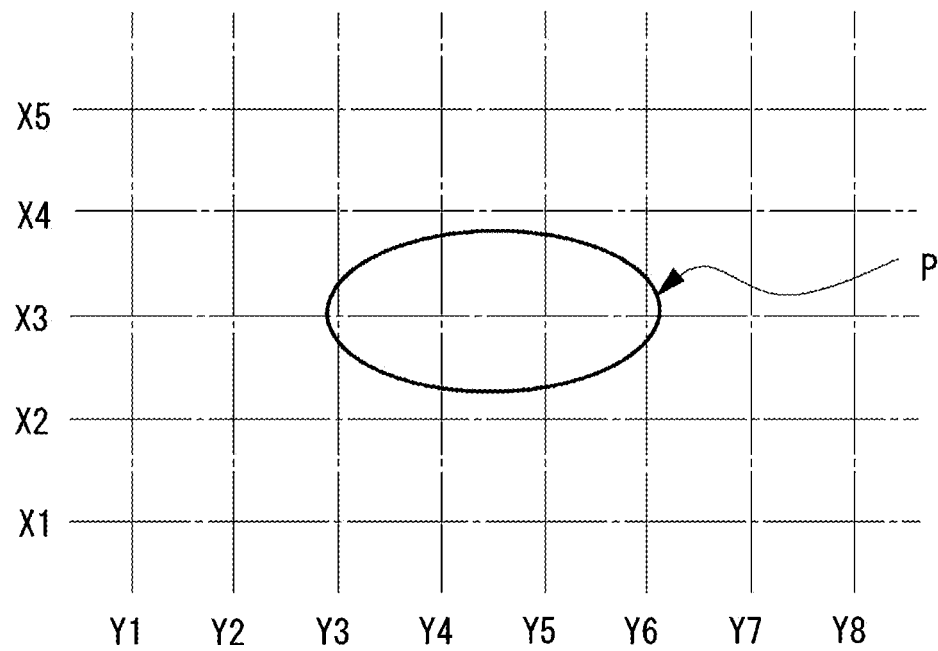
FIG. 5 illustrates an example of a method by which an invalid area identification unit identifies an invalid area.

The invalid area identification unit 140 determines whether an invalid area with no point cloud is present in point cloud data, that is, determines whether an area that lacks distance information is present in point cloud data. If an invalid area is present, the invalid area identification unit 140 identifies the position or size of the invalid area. The invalid area identification unit 140 identifies an invalid area with no point cloud with a certain or larger size according to whether the size of the invalid area is enough to make the invalid area a dangerous area in traveling. For example, the invalid area identification unit 140 identifies scanning lines among which a threshold number of point clouds or more are not present within a spacing between scanning lines (Y1, Y2, . . . , Yn) in the Y direction (depth direction), as illustrated in FIG. 5. In the example in the drawing, scanning lines Y3 to Y6 that scan an invalid area P with no point cloud are identified. Next, in the area including the identified canning lines in the Y direction, the invalid area identification unit 140 identifies scanning lines among which a threshold number of point clouds or more are not present within a spacing between scanning lines in the X direction (horizontal direction). In the example in the drawing, scanning lines X2 to X4 are identified. Thus, an area enclosed by scanning lines Y3 to Y6 in the Y direction and scanning lines X2 to X4 in the X direction is identified as an invalid area. The invalid area identification unit 140 submits coordinate information about the four corners of the invalid area enclosed by these scanning lines to the target recognition unit 150. The method of identifying the invalid area P is not limited to the above method. The invalid area P may be identified by another method.

The target recognition unit 150 receives coordinate information representing the invalid area with no point cloud. According to the IR image captured by the IR camera 110R or 110L, the target recognition unit 150 then determines, from features of an area equivalent to the invalid area with no point cloud and a periphery of the invalid area, whether a particular target is present in the invalid area and its periphery, through image recognition. Particular targets include targets that do not impair the travel of a vehicle (such as, for example, a manhole, a white line, a puddle, a rail, and a grating (lid)). These particular targets may strongly reflect infrared rays or may strongly absorb infrared rays, depending on the degree of sunlight irradiation. Therefore, the dynamic range for the brightness of the IR cameras 110R and 110L may be exceeded. What type of target is to be selected as a particular target is determined in advance.

The IR image used in image recognition is one of the stereo images yet to be combined to create point cloud data. When the target recognition unit 150 uses a stereo image to perform image recognition, the target recognition unit 150 can use coordinate information representing an invalid area with no point cloud without alteration to recognize whether a particular target is present in the invalid area and its periphery.

In a certain embodiment, the target recognition unit 150 uses artificial intelligence (AI) to determine whether a particular target is present. As described above, particular targets include a manhole, a white line, a puddle, a rail, a grating (lid), and the like. These features are stored in an image database as teaching data. The image database learns features. The target recognition unit 150 uses the image database after learning to recognize a particular target in an area equivalent to an invalid area with no point cloud. When a particular target is recognized, it is found that the invalid area with no point cloud is not a dangerous area in traveling (such as, for example, a depression hole or a step protruding from a road). The result of recognition by the target recognition unit 150 is submitted to the obstacle detection unit 130.

The obstacle detection unit 130 determines whether an obstacle is present according to point cloud data created by the point cloud data creation unit 120, the result of identification by the invalid area identification unit 140, and the result of recognition by the target recognition unit 150. If an obstacle is present, the obstacle detection unit 130 detects the orientation of the obstacle, a distance to the obstacle, and the size of the obstacle.

Even when an invalid area with no point cloud is present in point cloud data, if the target recognition unit 150 recognizes a particular target in the invalid area with no point cloud and the vicinity of the invalid area, the obstacle detection unit 130 determines that the invalid area with no point cloud is not an obstacle. In this case, the obstacle detection unit 130 determines whether an obstacle is present with reference to point cloud data excluding the invalid area.

When an invalid area with no point cloud is present in point cloud data, if the target recognition unit 150 does not recognizes a particular target in the invalid area, the obstacle detection unit 130 determines that the invalid area with no point cloud is an obstacle. The result of detection by the obstacle detection unit 130 is used to alert the passenger in the vehicle M, to support the driving of the vehicle M, or to automatically drive the vehicle M.

Figure 6:
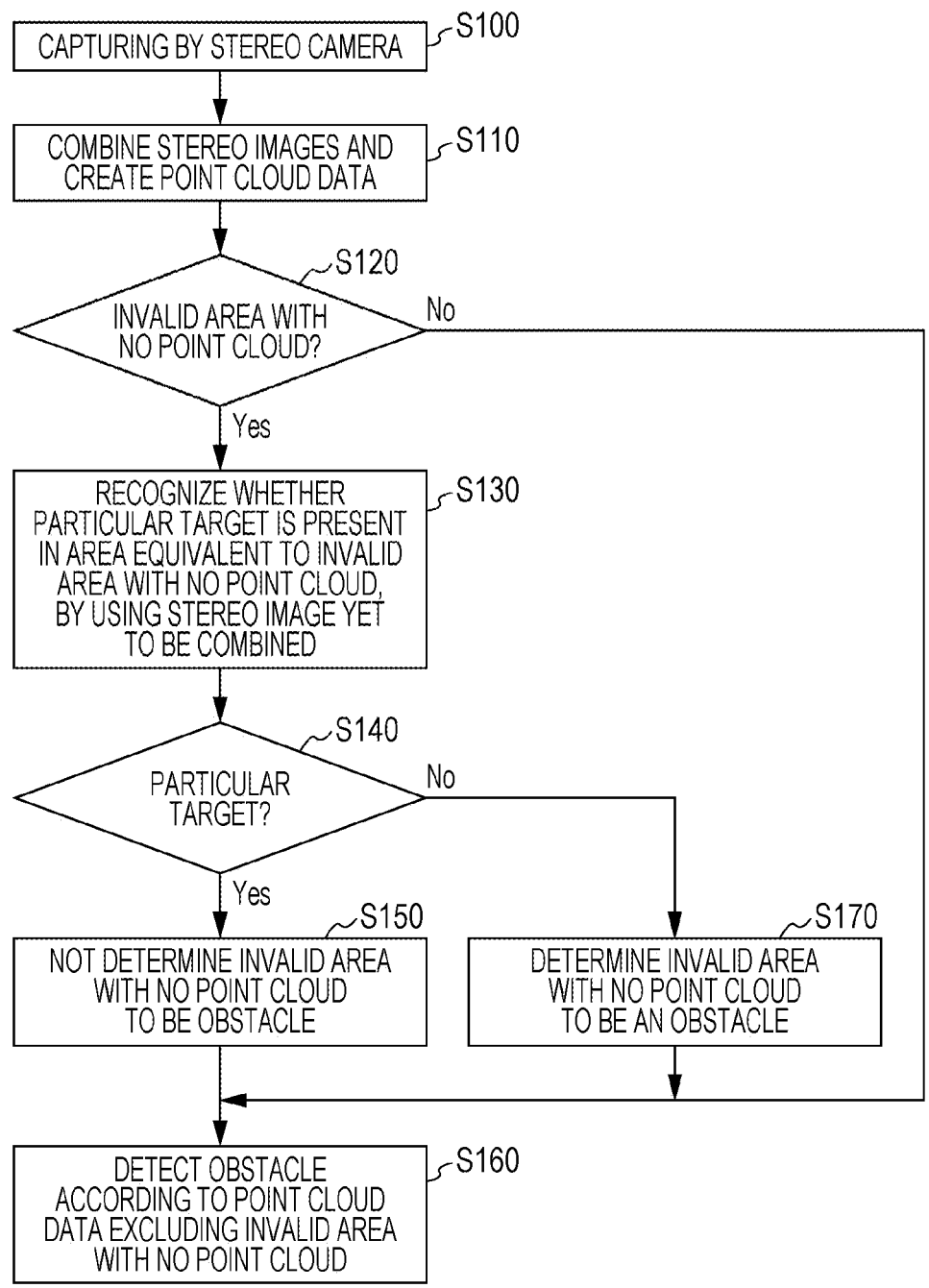
FIG. 6 is a flowchart illustrating the operation of the obstacle detection device according to the first example of the present invention.

Next, the operation of the obstacle detection device 100 in this example will be described with reference to the flowchart in FIG. 6. First, a scene in front of the vehicle is captured by the stereo camera 110 (S100), and the captured IR images on the right side and left side are submitted to the point cloud data creation unit 120. The point cloud data creation unit 120 combines the stereo images and creates point cloud data, which is three-dimensional position information about the captured target (S110). Then, the invalid area identification unit 140 determines whether an invalid area with no point cloud is present in the created point cloud data (S120). If the invalid area identification unit 140 determines that an invalid area with no point cloud is present, the invalid area identification unit 140 submits coordinate information representing the invalid area to the target recognition unit 150. The target recognition unit 150 recognizes whether a particular target is present in an area equivalent to the invalid area, according to the IR image captured by the IR camera 110L, the IR image having been used in the creation of the point cloud data (S130).

If the target recognition unit 150 recognizes a particular target (S140), the obstacle detection unit 130 does not determine the invalid area with no point cloud to be an obstacle (S150), and detects an obstacle according to point cloud data excluding the invalid area with no point cloud (S160). If the target recognition unit 150 does not recognize a particular target, the obstacle detection unit 130 determines the invalid area with no point cloud to be an obstacle (S170).

As described above, according to this example, when an invalid area with no point cloud is present, if a particular target can be recognized in an area equivalent to an invalid area with no point cloud and to the vicinity of the invalid area according to a captured image yet to be combined to create point cloud data, the invalid area with no point cloud is not determined to be an obstacle. Therefore, false detection can be reduced unlike a case in which an invalid area with no point cloud is automatically determined to be an obstacle. Furthermore, according to this example, the performance of the obstacle detection device can be improved at a low cost without having to raise the performance of an imaging camera (such as a dynamic range and IR output) or add another sensor.

Although an example in which an IR image yet to be combined to create point cloud data is used to perform image recognition for a particular target has been described, image recognition based on an IR image is merely for prevention of false detection of an obstacle and is just a complement to functions of the obstacle detection device. That is, it is difficult to implement functions of the obstacle detection device with image recognition based on an IR image alone. This is because image recognition enables precise determination about the presence or absence of an obstacle and the orientation of the obstacle but is difficult to enable precise determination about the size of the obstacle and a distance to the obstacle.

Figure 7:
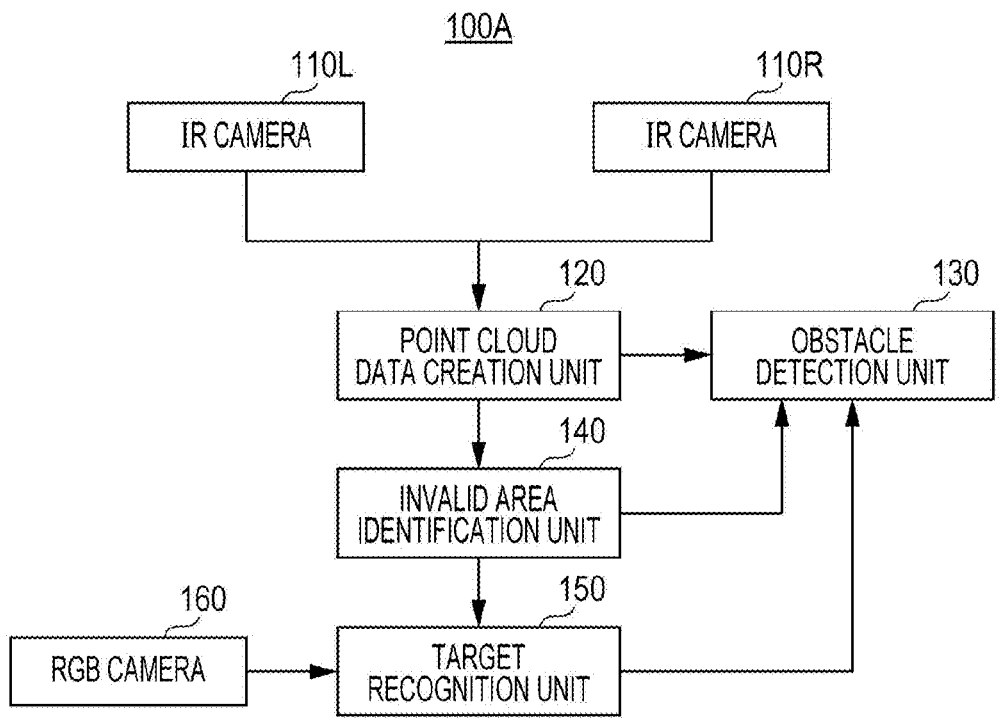
FIG. 7 is a block diagram illustrating the structure of an obstacle detection device according to a second example of the present invention.

Next, a second example of the present invention will be described. FIG. 7 is a block diagram illustrating the structure of an obstacle detection device 100A according to the second example of the present invention. In FIG. 7, constituent elements that are the same as in FIG. 3 will be given the same reference numerals. In this example, a red-green-blue (RGB) camera 160 is additionally included. The RGB camera 160 captures a scene in front of the vehicle M and submits a captured RGB color image to the target recognition unit 150, as with the stereo camera 110. In the first example, the target recognition unit 150 used an IR image to perform image recognition for a particular target. In this example, however, the target recognition unit 150 uses a color image captured by the RGB camera 160 to perform image recognition for a particular target.

The position at which to attach the RGB camera 160 is adjusted or coordinate conversion is performed on the RGB image captured by the RGB camera 160 so that a captured RGB image represents the same coordinate space as IR images captured by the stereo camera 110. An RGB image used by the target recognition unit 150 is synchronized with IR images that caused an invalid area with no point cloud.

Since an IR image is a grayscale image that represents a black-and-white tint, features of the target are restricted unlike an RGB color image. Therefore, when an RGB color image is used, precision in image recognition for the target is higher than when an IR image is used. Furthermore, since the RGB camera 160 is used separately from the stereo camera 110, the number of pixels in the RGB camera 160 and its optical characteristics are not restricted by the stereo camera 110. Therefore, the RGB camera 160 can capture a color image with higher image quality when compared with the stereo camera 110.

Thus, in this example, when an invalid area with no point cloud is identified, image recognition is performed for a particular target by using an RGB image. Therefore, precision in image recognition for a particular target can be improved, and when an invalid area with no point cloud is generated, false detection of an obstacle can be reduced.

Although, in the above examples, examples in which IR cameras have been used as a stereo camera have been described, this is not a limitation of the present invention. Cameras that use visible light to capture color images may be used as a stereo camera. Although, in the above examples, an invalid area with no point cloud has been rectangular, this is not a limitation of the present invention. An invalid area with no point cloud may be identified as being circular or polygonal. A positional relationship between an invalid area with no point cloud and a particular target to be recognized is such that not only when the two completely overlap but also when most of the two overlap, the particular target may be regarded as having been determined to be in the invalid area and an area close to the invalid area through image recognition.

Next, a third example of the present invention will be described. In the first and second examples described above, image recognition has been performed to compensate for a depth missing area (an invalid area with no point cloud), the area being generated when a dynamic range of a camera is insufficient for the brightness of a captured target. In image recognition by AI, if a confidence factor, in image recognition, calculated in a recognition process is higher than a threshold value set in advance, the recognition result can be used by regarding it as correct. In this type of image recognition by AI as well, however, if a non-obstacle and an obstacle apparently look like each other, the non-obstacle may be mistakenly recognized as an obstacle or the obstacle may be mistakenly recognized as a non-obstacle.

An invalid area with no point cloud is likely to be generated in a target that has uniformly high brightness as in white lines or a pedestrian crossing. For example, a pallet, as in FIG. 8, that has a step formed between white lines (a pallet is an obstacle called a pseudo pedestrian crossing) may be mistakenly recognized as a pedestrian crossing due to the appearance of an IR image. This may result in the inability to detect a groove of the pallet as an obstacle. Each white line of the pallet has substantially the same height as the road surface. A groove between white lines of the pallet is lower than the road surface. If the pallet is highly bright, an invalid area is generated in point cloud data due to the high brightness of the white line. However, since the groove is not highly bright, a point cloud is created, that is, the step of the groove can be measured.

A possible solution to the above problem is to improve precision in image recognition. However, recall may be lowered. Generally, the following two methods are thought to be possible to improve precision.

Figure 8:
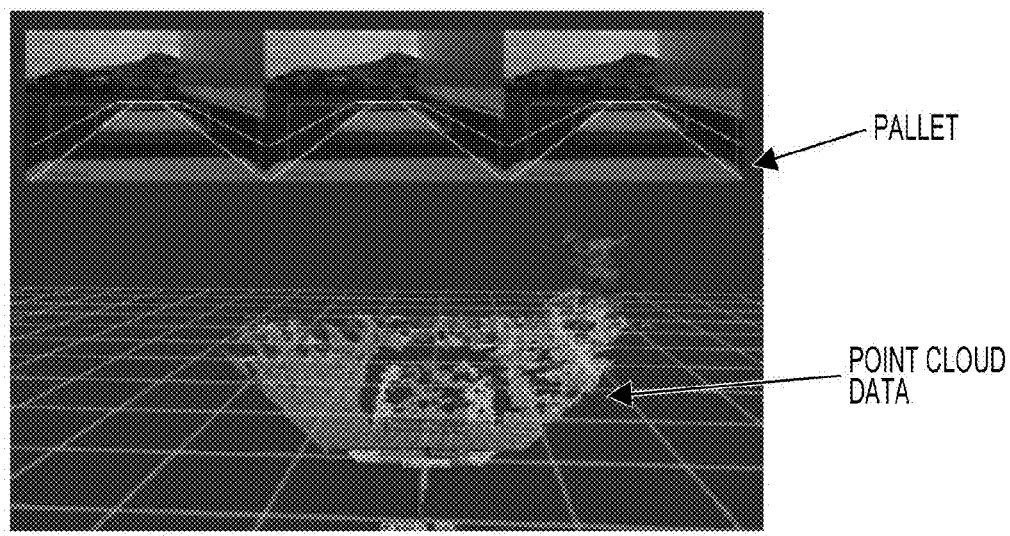
FIG. 8 indicates a pallet (pseudo pedestrian crossing) and its point cloud data.

(1) To have a database perform learning with more data (for example, label indicating that the pallet (pseudo pedestrian crossing) in FIG. 8 is not a pedestrian crossing) in image recognition by AI
(2) To make a decision criterion strict by increasing the threshold value for the confidence factor in image recognition However, if a pseudo pedestrian crossing as in FIG. 8 is learned, a feature on which to focus to decide that the target is not a pedestrian crossing is uncertain, so it is hard to predict an effect on a result of the recognition of another target. Therefore, some pedestrian crossings may not be recognized.

Figure 9:
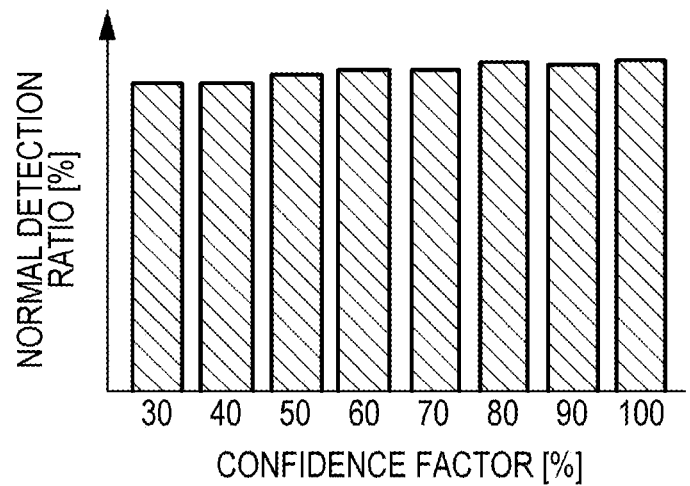
FIG. 9 is a graph representing a relationship between a confidence factor in image recognition and a normal detection ratio (precision)
Figure 10:
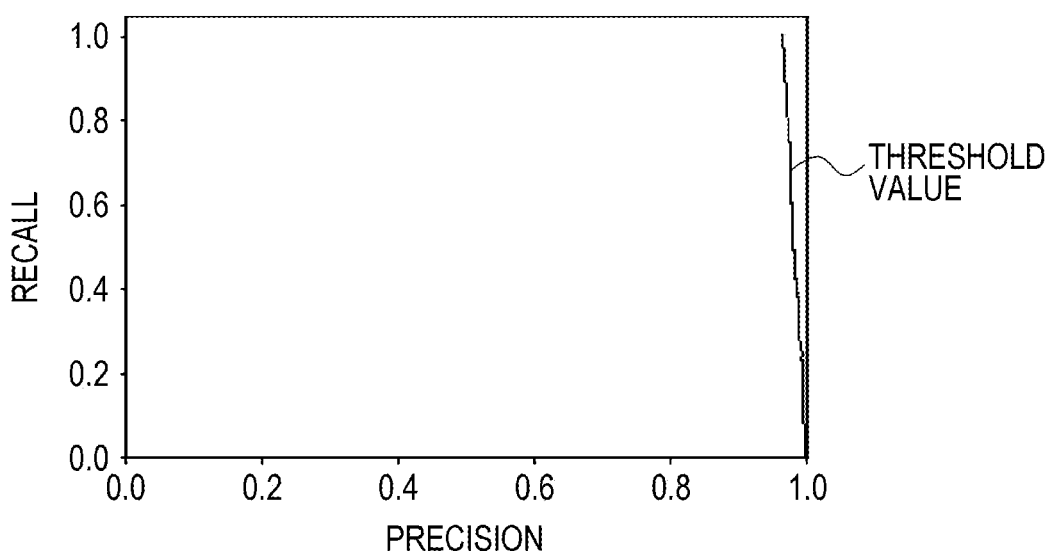
FIG. 10 illustrates a relationship between recall and precision in image recognition with a threshold value being changed.

FIG. 9 is a bar graph representing a relationship between confidence factor bands and precision with which a pedestrian crossing is recognized. FIG. 10 illustrates a relationship between recall and precision with the confidence factor threshold value being changed. As illustrated in FIG. 9, even when the confidence factor in image recognition is low, precision in the recognition of the pedestrian crossing remains substantially unchanged. In other words, even when the threshold value for the confidence factor is increased, there is no large effect on precision in the recognition of the pedestrian crossing. As illustrated in FIG. 10, however, as the threshold value for the confidence factor is increased, precision is raised and a shift occurs to the right of the graph, greatly lowering recall. This is problematic in that the pedestrian crossing darkened due to the lowered recall is not regarded as a target in recognition.

As described above, there are many technical problems in improving precision in image recognition. In the third example, therefore, it is possible to correctly detect an obstacle, such as a pallet (pseudo pedestrian crossing) in FIG. 8, that would otherwise tend to be mistakenly recognized in image recognition but can be correctly detected in spite of distance measurement being needed, instead of improving precision in image recognition as described in (1) and (2) above.

Figure 11:
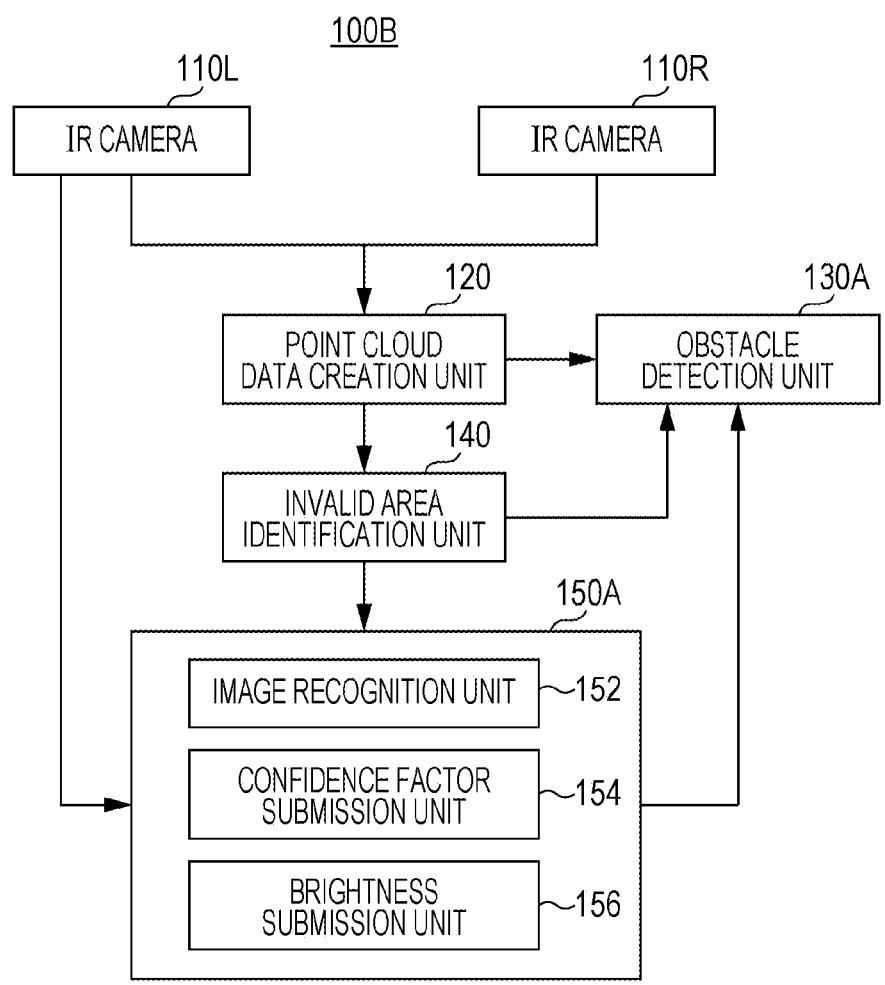
FIG. 11 is a block diagram illustrating the structure of an obstacle detection device according to a third example of the present invention.

FIG. 11 is a block diagram illustrating the structure of an obstacle detection device 100B according to the third example of the present invention. In FIG. 11, constituent elements that are the same as in the first example in FIG. 3 will be given the same reference numerals. In the third example, a target recognition unit 150A includes: an image recognition unit 152 that performs image recognition on a particular target in an invalid area by using an IR image, a confidence factor submission unit 154 that submits a confidence factor in image recognition by the image recognition unit 152; and a brightness submission unit 156 that submits the brightness of the IR image used in image recognition.

The image recognition unit 152 uses a database that has learned features of particular targets to recognize whether an IR image captured by the IR camera 110L is applied as a particular target. Examples of particular targets are a pedestrian crossing, a manhole, a white line, a rail, and a grating (lid). The database stores learning data, in which a teacher label is learned, for each particular target, the teacher label indicating a relationship between a feature of image data and the fact that the image data is a particular target. The database includes, for example, learning data related to pedestrian crossings, learning data related to white lines, learning data related to rails, and learning data related to gratings. When an invalid area with no point cloud is identified, the image recognition unit 152 performs image recognition on a particular target by using the database and an IR image captured by the IR camera 110L, as in the first example.

When image recognition is performed on a particular target by the image recognition unit 152, the confidence factor submission unit 154 submits a confidence factor in the image recognition to an obstacle detection unit 130A. When, for example, image recognition is performed on a manhole by the image recognition unit 152, the confidence factor submission unit 154 acquires a confidence factor in the image recognition of the manhole. If a ratio is high at which a feature, obtained from the IR image, of the manhole matches the feature, in the database, of the manhole, the confidence factor is also rated in proportion to the ratio.

The brightness submission unit 156 calculates the average brightness of the IR image used by the image recognition unit 152 and submits the calculated average brightness to the obstacle detection unit 130A. The average brightness of the IR image may be the average brightness of the entire IR image or may be the average brightness of a partial area of the IR image used in image recognition. The brightness submission unit 156 may also calculate the average brightness of thinned-out pixels, besides the average brightness of all pixels in the entire IR image or a partial area of the IR image. The IR image is a grayscale image representing a black-and-white tint. The brightness is a grayscale value. The brightness submission unit 156 may further calculate the average of brightness distributed in the vicinity of the midpoint between the maximum brightness and minimum brightness of the IR image.

The obstacle detection unit 130A decides whether to use the result of recognition by the target recognition unit 150A in a decision about an obstacle, according to the confidence factor from the confidence factor submission unit 154 and the brightness from the brightness submission unit 156.

Figure 12:
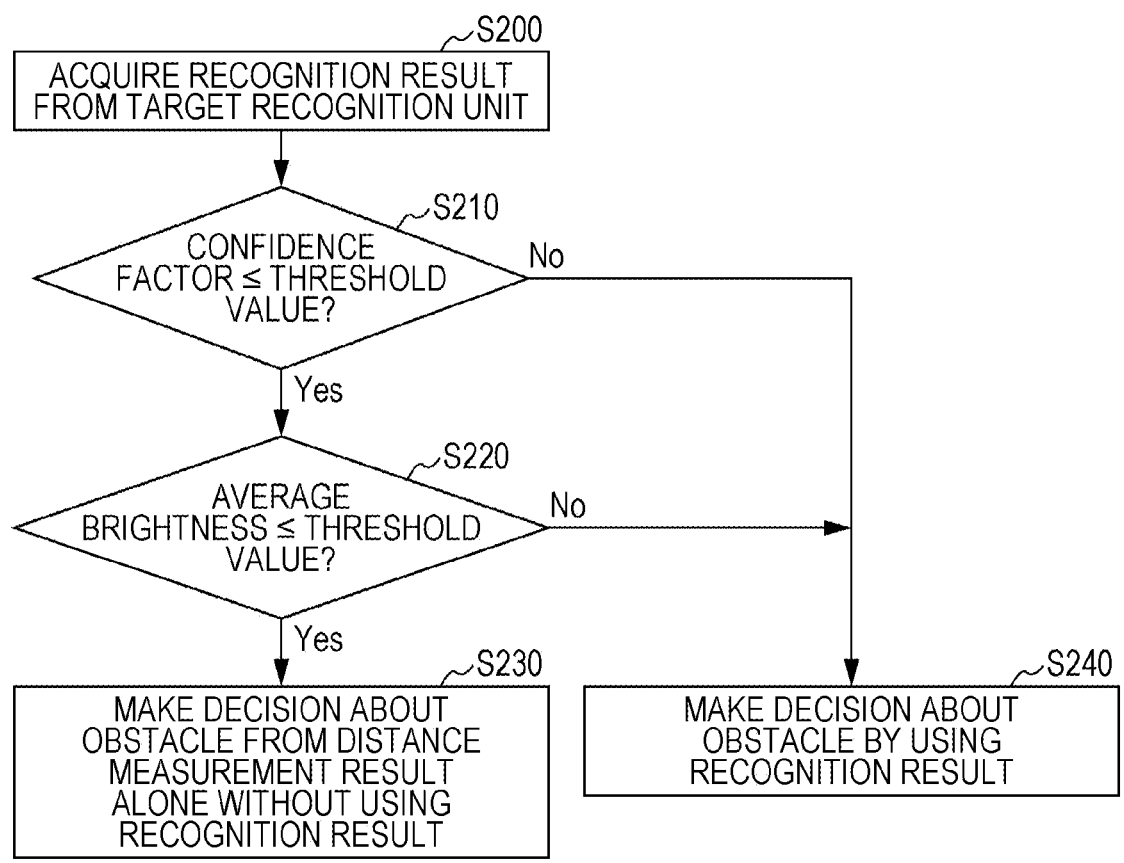
FIG. 12 is a flowchart illustrating the operation of the obstacle detection device according to the third example of the present invention.

FIG. 12 is a flowchart illustrating the operation of the obstacle detection device in this example. The obstacle detection unit 130A receives a recognition result from the target recognition unit 150A (S200), and then decides whether the confidence factor submitted from the confidence factor submission unit 154 is lower than or equal to a threshold value (S210). The threshold value is determined in advance for each particular target. For example, the threshold value may be 0.6 (60%). The obstacle detection unit 130A makes this decision about whether the confidence factor is lower than or equal to the threshold value each time the obstacle detection unit 130A receives an image recognition result from the image recognition unit 152.

If the confidence factor is lower than or equal to the threshold value, the obstacle detection unit 130A decides whether the average brightness of the IR image, the average brightness being submitted from the brightness submission unit 156, is lower than or equal to a threshold value (S220). The threshold value is determined in advance for each particular target. For example, when one pixel is 8-bit data (in which case the maximum brightness is 256), the threshold value may be 60. If both the confidence factor and the average brightness are lower than or equal to their respective threshold values, the obstacle detection unit 130A makes a decision about an obstacle from a distance measurement result (point cloud data) alone without using the result of recognition by the target recognition unit 150A (S230). That is, a low confidence factor indicates that the possibility is high that the image recognition result is incorrect when compared with a high confidence factor, and low average brightness indicates that the possibility is high that there is no invalid area with no point cloud. Therefore, if the recognition result from the image recognition unit 152 is used, a particular target may be mistakenly recognized.

If the confidence factor is larger than its threshold value or the average brightness is higher than its threshold value, the obstacle detection unit 130A makes a decision about an obstacle by using the result of recognition by the target recognition unit 150A (S240). That is, a high confidence factor indicates that the possibility is high that the image recognition result is correct, and high average brightness indicates that the possibility is high that there is an invalid area with no point cloud. In this case, when the result of recognition by the target recognition unit 150A is used to compensate the invalid area with no point cloud, precision in the detection of an obstacle is improved.

Figure 13:
FIG. 13 indicates an example of an IR image of a pedestrian crossing.
Figure 14:
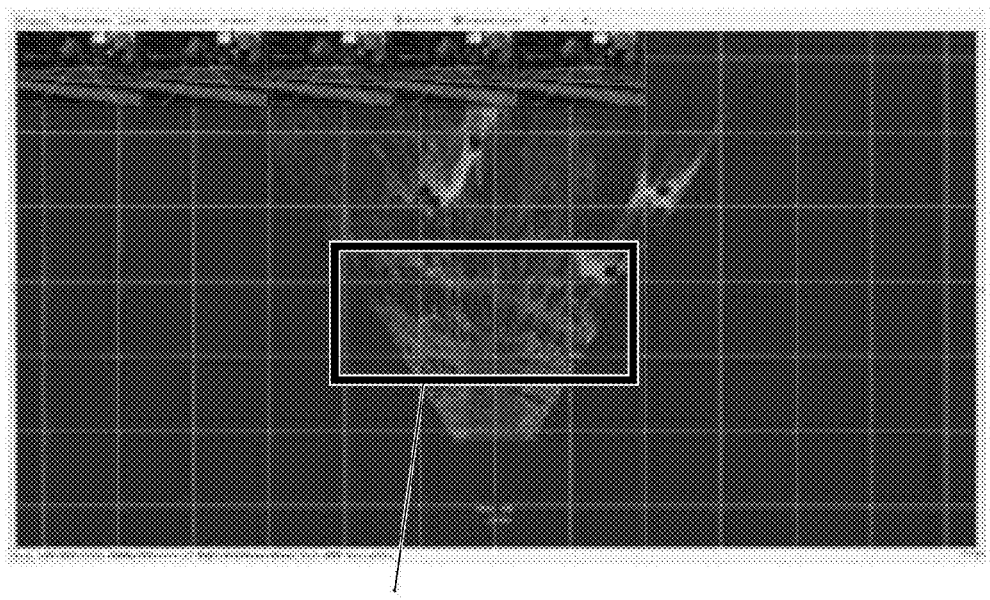
FIG. 14 indicates point cloud data created from the IR image in FIG. 13.

FIG. 13 indicates an example of an IR image of a pedestrian crossing. FIG. 14 indicates an example of point cloud data created from the IR image in FIG. 13. The average brightness of the IR image in FIG. 13 is 54. Although the pedestrian crossing is dark, the white lines are clear; the confidence factor of the recognition result for the pedestrian crossing is 99%. Part of the point cloud data is non-uniform in distance measurement and some point clouds are missing, as in FIG. 14. In this case, the confidence factor is high in spite of brightness being low, so the result of recognition by the target recognition unit 150A is used to make a decision about an obstacle.

Figure 15:
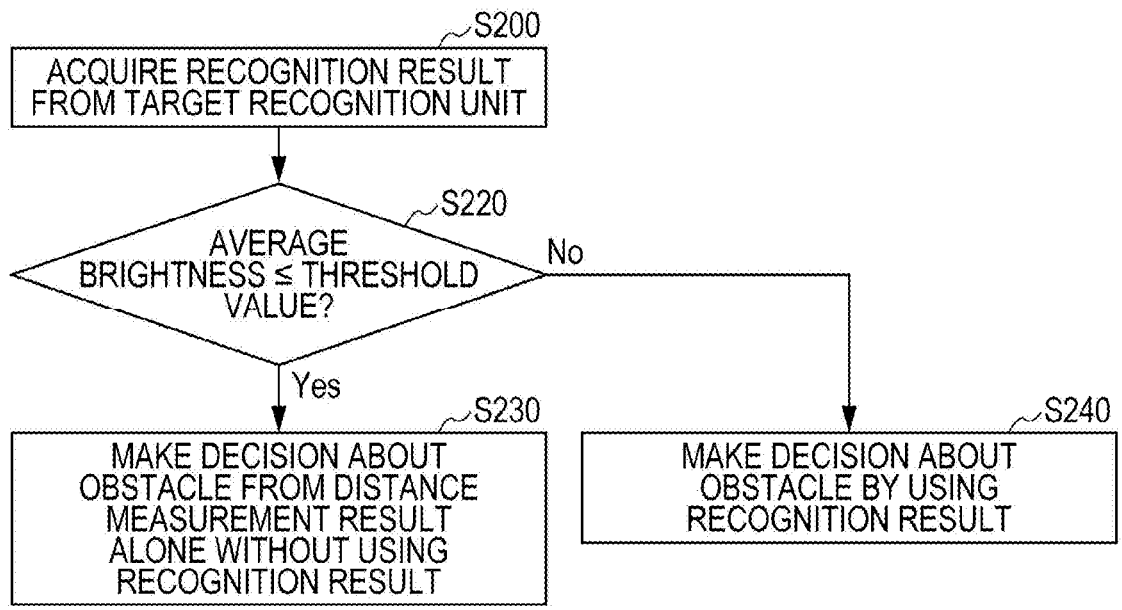
FIG. 15 is a flowchart illustrating the operation of the obstacle detection device according to a variation of the third example of the present invention.

FIG. 15 is a flowchart of a variation of the third example of the present invention. In this variation, the obstacle detection unit 130A decides whether to use the recognition result by using the average brightness of the IR image alone without using the confidence factor. Other operation is the same as in the flowchart in FIG. 12.

Figure 16:
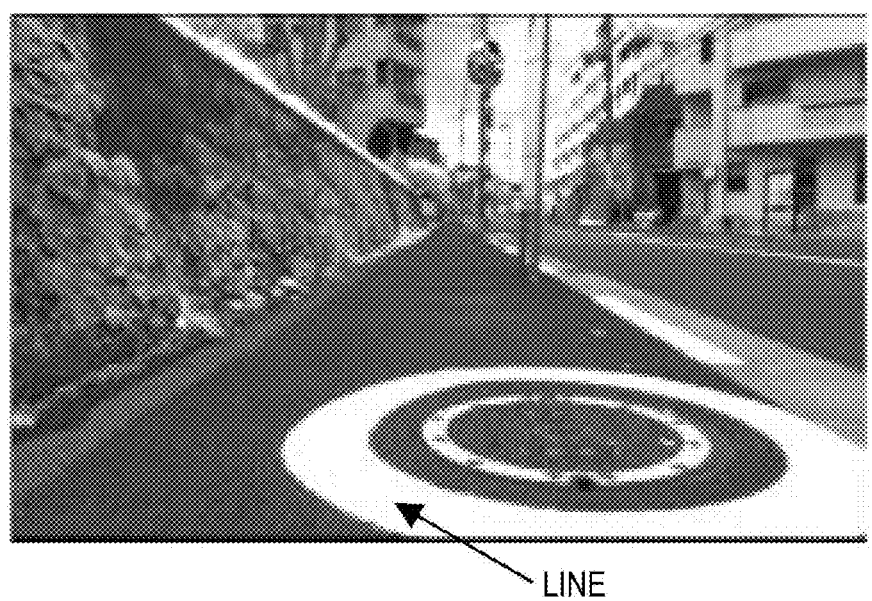
FIG. 16 indicates an example of an IR image of a manhole with an orange line.
Figure 17:
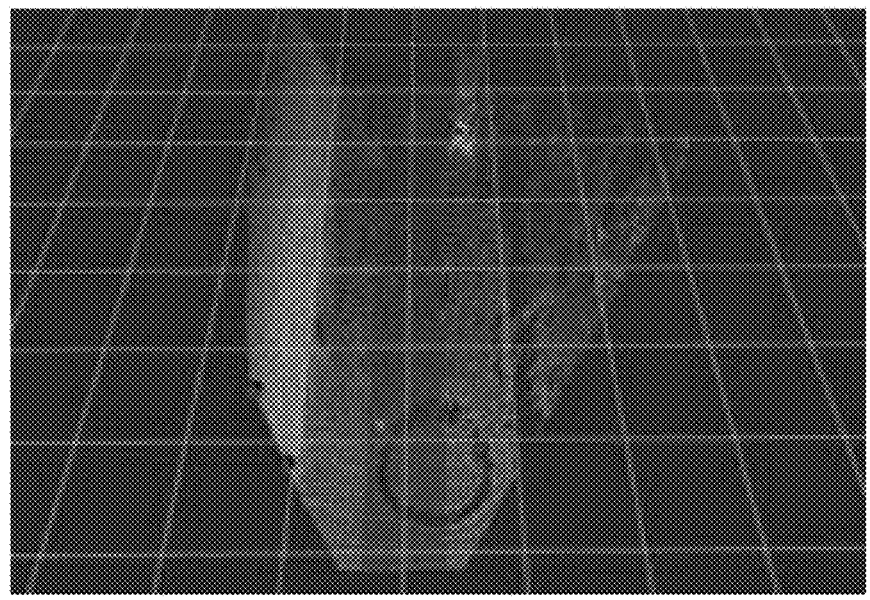
FIG. 17 indicates point cloud data created from the IR image in FIG. 16.
Figure 18:
FIG. 18 indicates an example of an IR image of a manhole without an orange line.

FIG. 16 indicates an example of an IR image of a manhole. In the drawing, a circular line is formed in orange around the manhole. The average brightness of an area including the line is 128. This point cloud data includes a circular depth missing area at the position corresponding to the line, as in FIG. 17. FIG. 18 indicates an example of an IR image of a manhole without a line as in FIG. 16. The average brightness of the IR image in FIG. 18 is 72. The point cloud data has no depth missing area unlike the IR image in FIG. 19.

Figure 19:
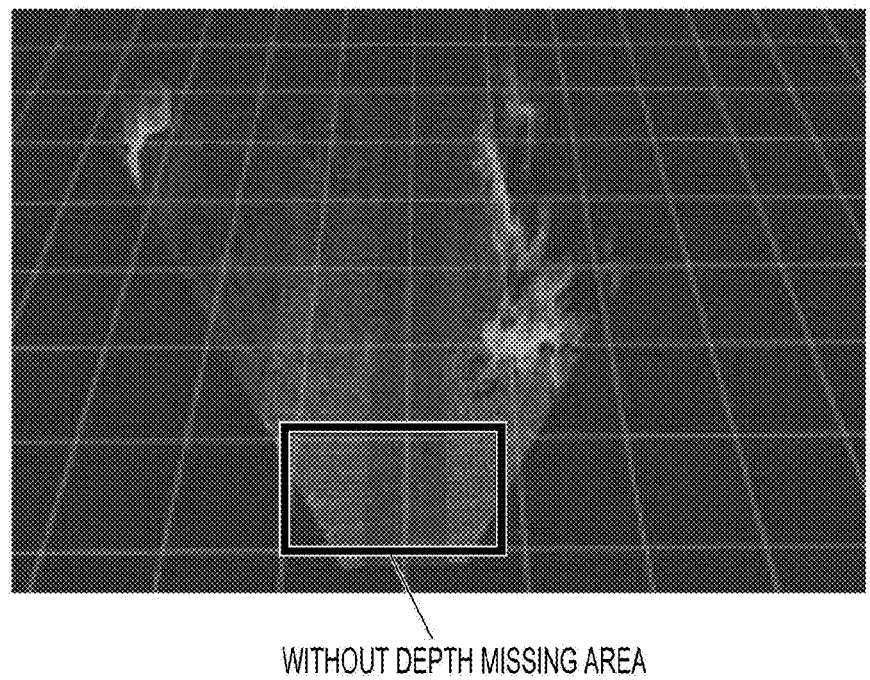
FIG. 19 indicates point cloud data created from the IR image in FIG. 18.

If the threshold value of the average brightness is set to 60 as is the pedestrian crossing, a dark hole on a road may be mistakenly recognized as a manhole as in FIG. 18. If the recognition result represents a manhole, the threshold value for the average brightness is set to 80. Only when the average brightness is higher than or equal to 80, the recognition result is used to make a decision about an obstacle. Thus, when a manhole as in FIG. 16 is photographed, since the average brightness is higher than the threshold value, the recognition result of the image of the manhole is used to make a decision about an obstacle. When a manhole, as in FIG. 18, that produces average brightness lower than the threshold value is photographed, point cloud data in FIG. 19 is used to make a decision about an obstacle. This can prevent a manhole from being mistakenly recognized.

In this example, precision in the recognition of the pseudo pedestrian crossing in FIG. 8 can be improved by about 96% when compared with the prior art. In normal actual travel in which a pseudo pedestrian crossing is not imaged, the ratio at which recall in the recognition of a pedestrian crossing was within 2%, indicating that the ratio remained substantially unchanged. Since a pseudo pedestrian crossing can be detected as an obstacle with recall unchanged, it is possible to prevent a pedestrian crossing resulting in a dark picture as in FIG. 13 from being mistakenly detected as in the prior art and recall in the detection of an obstacle can be improved.

The third example described above can also be applied to the second example. In this case, it is decided whether to use the result of recognition by the image recognition unit 152 in the detection of an obstacle, according to brightness information calculated from an RGB image captured by the RGB camera 160.

Figure 20:
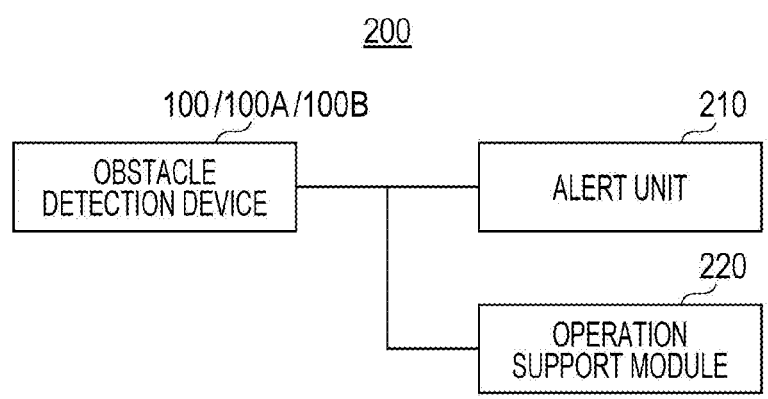
FIG. 20 is a block diagram illustrating the structure of an operation support system to which the obstacle detection device according to the first, second, or third example is applied.

FIG. 20 is a block diagram illustrating the structure of an operation support system to which the obstacle detection device according to the first, second, or third example is applied. The operation support system 200 includes the obstacle detection device 100, 100A, or 100B described in the above first, second, or third example, an alert unit 210 that alerts the passenger, and an operation support module 220 that supports the operation of the vehicle M. The alert unit 210 includes a display unit or a voice output unit, for example. When an obstacle is detected in front of the vehicle M, the alert unit 210 alerts the passenger of the presence of an obstacle through image information or voice information. Furthermore, in cooperation with control of the operation of the vehicle M, the operation support module 220 decelerates the vehicle M to prevent a collision with an obstacle or changes the direction of travel so as to bypass the obstacle.

It will be appreciated that the obstacle detection device in the above examples can also be applied to transport devices and moving bodies other than vehicles.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An obstacle detection device comprises:
    a stereo camera;
    a creation means for creating point cloud data according to a stereo image captured by the stereo camera;
    an obstacle detection means for detecting an obstacle according to the created point cloud data; and
    a recognition means for recognizing a particular target through image recognition;
    wherein the obstacle detection means detects an obstacle by using point cloud data excluding an area recognized by the recognition means as being a particular target and a confidence factor in image recognition by the recognition means.

2. The obstacle detection device according to claim 1, wherein the recognition means recognizes a particular target in an area equivalent to an invalid area with no point cloud, the invalid area being included in the point cloud data.

3. The obstacle detection device according to claim 2, wherein the recognition means includes an identification means for identifying an invalid area with no point cloud, the invalid area being included in the point cloud data.

4. The obstacle detection device according to claim 3, wherein when a particular target is recognized by the recognition means, the obstacle detection means does not determine the invalid area to be an obstacle.

5. An obstacle detection device comprises:
    a stereo camera;
    a creation means for creating point cloud data according to a stereo image captured by the stereo camera;
    an obstacle detection means for detecting an obstacle according to the created point cloud data; and
    a recognition means for recognizing a particular target through image recognition;
    wherein the obstacle detection means decides whether to detect an obstacle by using a result of recognition by the recognition means according to brightness information about an image used by the recognition means and a confidence factor in image recognition by the recognition means.

6. The obstacle detection device according to claim 5, wherein:
    when the brightness information is lower than or equal to a first threshold value, the obstacle detection means detects an obstacle by using only the point cloud data; and
    when the brightness information exceeds the first threshold value, the obstacle detection means detects an obstacle by using both the point cloud data and the result of recognition by the recognition means.

7. The obstacle detection device according to claim 5, wherein:
    when the brightness information is lower than or equal to the first threshold value and the confidence factor is lower than or equal to a second threshold value, the obstacle detection means detects an obstacle by using only the point cloud data; and
    when at least one of the first threshold value for the brightness information and the second threshold value for the confidence factor is exceeded, the obstacle detection means detects an obstacle by using both the point cloud data and the result of recognition by the recognition means.

8. The obstacle detection device according to claim 7, wherein the first threshold value for the brightness information is set for each particular target.

9. The obstacle detection device according to claim 1, wherein:
    the particular target is a target that does not become an obstacle; and
    the particular target is determined in advance.

10. The obstacle detection device according to claim 2, wherein:
    the point cloud data is three-dimensional information including distance information obtained by combining an image captured by the stereo camera; and
    the invalid area with no point cloud is an area that lacks distance information.

11. The obstacle detection device according to claim 1, wherein the recognition means recognizes a particular target according to an image captured before point cloud data is created.

12. The obstacle detection device according to claim 1, wherein the recognition means recognizes a particular target according to an image captured by another camera different from the stereo camera, the image being synchronized with the stereo image captured by the stereo camera.

13. The obstacle detection device according to claim 1, wherein the stereo camera is an infrared camera.

14. The obstacle detection device according to claim 1, wherein the stereo camera captures a scene in front of a moving body.

15. An obstacle detection method that detects an obstacle by using a stereo image captured by a stereo camera, the method comprising:
    creating point cloud data including distance information about a captured image, according to the stereo image captured by the stereo camera;
    identifying whether an invalid area with no point cloud is present in the point cloud data;
    recognizing, through image recognition, whether a particular target is present in an invalid area with no point cloud; and
    detecting, when a particular target is recognized, an obstacle by using point cloud data excluding the invalid area with no point cloud and a confidence factor in the image recognition.

16. An obstacle detection method that detects an obstacle by using a stereo image captured by a stereo camera, the method comprising:
- creating point cloud data including distance information about a captured target, according to the stereo image captured by the stereo camera;
- identifying whether an invalid area with no point cloud is present in the point cloud data;
- recognizing, through image recognition, whether a particular target is present in an invalid area with no point cloud; and
- deciding whether to detect an obstacle by using a result of recognition in the recognizing according to brightness information about an image used in the recognizing and a confidence factor in the image recognition.

17. A non-transitory computer-readable storage medium that stores an obstacle detection program executed by an electronic device, the program comprising:
- creating point cloud data including distance information about a captured image, according to a stereo image captured by a stereo camera;
- identifying whether an invalid area with no point cloud is present in the point cloud data;
- recognizing, through image recognition, whether a particular target is present in an invalid area with no point cloud; and
- detecting, when a particular target is recognized, an obstacle by using point cloud data excluding the invalid area with no point cloud and a confidence factor in the image recognition.

18. A non-transitory computer-readable storage medium that stores an obstacle detection program executed by an electronic device, the program comprising:
- creating point cloud data including distance information about a captured target, according to a stereo image captured by a stereo camera;
- identifying whether an invalid area with no point cloud is present in the point cloud data;
- recognizing, through image recognition, whether a particular target is present in an invalid area with no point cloud; and
- deciding whether to detect an obstacle by using a result of recognition in the recognizing according to brightness information about an image used in the recognizing and a confidence factor in the image recognition.

* * * * *